(12) United States Patent
Sweeney et al.

(10) Patent No.: US 8,976,785 B2
(45) Date of Patent: Mar. 10, 2015

(54) SYSTEM AND METHOD FOR VOICE REDUNDANCY SERVICE

(75) Inventors: Jeffrey M. Sweeney, Olathe, KS (US); Michael C. Robinson, Overland Park, KS (US)

(73) Assignee: CenturyLink Intellectual Property LLC, Denver, CO (US)

( * ) Notice: Subject to any disclaimer, the term of this patent is extended or adjusted under 35 U.S.C. 154(b) by 1220 days.

(21) Appl. No.: 11/823,528

(22) Filed: Jun. 28, 2007

(65) Prior Publication Data

US 2009/0003318 A1    Jan. 1, 2009

(51) Int. Cl.
*H04L 12/66* (2006.01)

(52) U.S. Cl.
CPC .................................... *H04L 12/66* (2013.01)
USPC .......................................... 370/354; 370/217

(58) Field of Classification Search
None
See application file for complete search history.

(56) References Cited

U.S. PATENT DOCUMENTS

| | | | | |
|---|---|---|---|---|
| 5,598,401 | A * | 1/1997 | Blackwell et al. | 370/385 |
| 5,889,470 | A * | 3/1999 | Kaycee et al. | 370/465 |
| 6,553,515 | B1 * | 4/2003 | Gross et al. | 714/47.2 |
| 6,926,708 | B1 * | 8/2005 | Franks-Farah et al. | 604/544 |
| 7,254,832 | B1 | 8/2007 | Christie, IV | |
| 7,260,089 | B2 | 8/2007 | Lowmaster | |
| 8,315,165 | B2 | 11/2012 | Eydelman et al. | |
| 2001/0053125 | A1 | 12/2001 | Staples et al. | |
| 2003/0091028 | A1 | 5/2003 | Chang et al. | |
| 2003/0202462 | A1 * | 10/2003 | Smith et al. | 370/216 |
| 2004/0032945 | A1 * | 2/2004 | Huang et al. | 379/359 |
| 2004/0170160 | A1 * | 9/2004 | Li et al. | 370/352 |
| 2005/0025043 | A1 * | 2/2005 | Mussman et al. | 370/216 |
| 2005/0053051 | A1 * | 3/2005 | Beyda et al. | 370/351 |
| 2005/0083928 | A1 | 4/2005 | Sivabalan et al. | |
| 2005/0141675 | A1 * | 6/2005 | Jung | 379/45 |
| 2005/0286711 | A1 * | 12/2005 | Lee et al. | 379/399.01 |
| 2006/0023657 | A1 | 2/2006 | Woodson et al. | |
| 2006/0050682 | A1 * | 3/2006 | Vance | 370/352 |
| 2006/0187898 | A1 * | 8/2006 | Chou et al. | 370/352 |
| 2006/0193447 | A1 | 8/2006 | Schwartz | |
| 2007/0004396 | A1 * | 1/2007 | Connelly | 455/423 |
| 2007/0023455 | A1 * | 2/2007 | Krengel et al. | 222/192 |
| 2007/0165611 | A1 * | 7/2007 | Yang et al. | 370/356 |
| 2008/0159273 | A1 | 7/2008 | Brugman | |
| 2008/0285485 | A1 | 11/2008 | Kingsley | |
| 2008/0285544 | A1 | 11/2008 | Qiu et al. | |
| 2008/0298348 | A1 * | 12/2008 | Frame et al. | 370/352 |
| 2009/0097471 | A1 | 4/2009 | Qiu et al. | |
| 2009/0161741 | A1 * | 6/2009 | Ginis et al. | 375/224 |
| 2009/0225744 | A1 | 9/2009 | Zerillo | |

OTHER PUBLICATIONS

U.S. Appl. No. 12/825,507; Non-Final Rejection dated Jul. 5, 2012; 33 pages.
U.S. Appl. No. 12/825,507; Non-Final Rejection dated Feb. 15, 2013; 44 pages.

(Continued)

*Primary Examiner* — Chirag Shah
*Assistant Examiner* — Jenkey Van
(74) *Attorney, Agent, or Firm* — Swanson & Bratschun, L.L.C.

(57) ABSTRACT

A system and method for providing voice redundancy service. A digital packet telephony service is monitored for continuity of the digital packet telephony service. Voice communication service is switched to a plain old telephone connection in response to determining the digital packet telephony service is unavailable.

22 Claims, 5 Drawing Sheets

(56) References Cited

OTHER PUBLICATIONS

U.S. Appl. No. 12/825,507; Final Rejection dated Oct. 10, 2013; 59 pages.
U.S. Appl. No. 12/825,507; Non-Final Rejection dated Apr. 11, 2014; 63 pages.
U.S. Appl. No. 12/825,507; Final Rejection dated Aug. 6, 2014; 66 pages.
U.S. Appl. No. 12/825,507; Notice of Allowance dated Dec. 19, 2014; 48 pages.

* cited by examiner

| Service Information 500 |
|---|
| 502 Account Number 1234567         June 2010 |
| 504 Customer: John & Jane Doe |
| 506 Phone number: 999-999-9898 |

| 508 Cable Connection | | 510 Telephone Connection | |
|---|---|---|---|
| 512 Total time for the month (minutes) | 43,200 | 512 Total time for the month (minutes) | 43,200 |
| 514 Uptime | 41,582 | 516 Uptime | 43,200 |
| 518 Uptime Percentage | 96.25 | 520 Uptime Percentage | 100 |
| 522 Downtime (minutes) | 1618 | 524 Downtime (minutes) | 0 |
| 526 Downtime Percentage | 3.75 | 528 Downtime Percentage | 0 |

| 530 Cable Failures | | 532 Telephone Failures | |
|---|---|---|---|
| 534 Date/Time | 538 Duration (mins) | 540 Date/Time | 536 Duration (mins) |
| 6/4/10-10:48 a.m | 50 | | |
| 6/9/10-1:12 a.m | 452 | | |
| 6/12/10-3:23 p.m | 344 | | |
| 6/18/10-3:43 a.m | 273 | | |
| 6/21/10-11:12 p.m | 401 | | |
| 6/24/10-12:17 a.m | 5 | | |
| 6/29/10-4:15 a.m | 93 | | |

SYSTEM AND METHOD FOR VOICE REDUNDANCY SERVICE

BACKGROUND

The use and development of communications services and related technologies has grown nearly exponentially in recent years. Communications consumers have come to expect better services, features, and devices at competitive prices. Many communications services, such as voice over Internet Protocol (VoIP) telephone service, meet all or some of these expectations. However, these services are not without problems, issues, and other technical challenges. In many cases, VoIP telephone service does not have the reliability of more established services, such as plain old telephone service (POTS). As a result, users may experience more frequent and extended downtimes during which they may not have phone access. This is exacerbated by the power and data connection requirements of VoIP. In most cases, if either power supplies or data connections fail, the VoIP service becomes unusable.

Frequently, individual customers and small businesses do not have the redundancy resources available to larger business. A communications line or dial-tone serves as a life-line during regular day life and emergency situations allowing a user to send and receive important information and summons help as needed. VoIP users are subject to increased exposure that may occur because of decreased reliability of services, devices, and protocols relied on by VoIP service. Outages may result in lost business, added work unnecessary stress, and potential risk during emergency situations.

Despite the limitations, many consumers continue to switch from POTS to VoIP service. Many telecommunications service providers have difficulty attracting new customers and enticing previous customers to return. The telecommunications service's provider continues to experience difficulty "winning back" customers as well as maintaining and enhancing revenue and customer relationships despite technological improvements and increased service offerings.

SUMMARY

To provide voice redundancy service to individual users and small business, a system and method for voice redundancy service is provided. In one embodiment, a digital packet telephony service may be monitored for continuity of the digital packet telephony service. A voice communication service may be switched to a plain old telephone connection in response to determining the digital packet telephony service is unavailable.

Another embodiment includes a voice redundancy switch. The voice redundancy switch may include a continuity detector for determining whether a digital packet telephony service is available through a digital connection. The voice redundancy switch may further include a switch in communication with the monitor for switching from the digital connection to a plain old telephone connection and POTS in response to determining the digital packet telephony service is unavailable.

Yet another embodiment includes a voice redundancy switch. The voice redundancy switch may include a processor for executing a set of instructions. The voice redundancy switch may include a switch for switching between a digital connection and a plain old telephone connection for providing voice calling services in response to determining the digital connection is unavailable for voice communications. The voice redundancy switch may also include a memory for storing the set of instructions, wherein the set of instructions monitors a digital packet telephony service provided by the cable connection for continuity of the digital packet telephony service, and commands the switch to switch to the plain old telephone connection in response to determining the digital packet telephony service is unavailable.

BRIEF DESCRIPTION OF THE DRAWINGS

Illustrative embodiments of the present invention are described in detail below with reference to the attached drawing figures, which are incorporated by reference herein and wherein.

DETAILED DESCRIPTION OF THE DRAWINGS

Illustrative embodiments of the present invention provide a system and method for voice redundancy service. The voice redundancy service is directed toward individual customers and small businesses that may not have redundancy options or similar resources. In particular, a voice redundancy switch may be used to provide voice service through a plain old telephone connection in the event that digital packet telephony service available through a digital connection fails. As a result, the user may be reassured that a voice connection is available at all times for personal, business, or emergency communications. The voice redundancy switch and associated service provide telecommunications companies a broader income base and opportunities to win back customers that may have switched services.

Additionally, the telecommunications companies may receive service information from an installed voice redundancy switch regarding the voice service and availability provided by the VoIP connection and the telephone connection. The service information may be displayed or sent to the user to illustrate the increased reliability of POTS in order to persuade the user to switch services.

Figure 1:
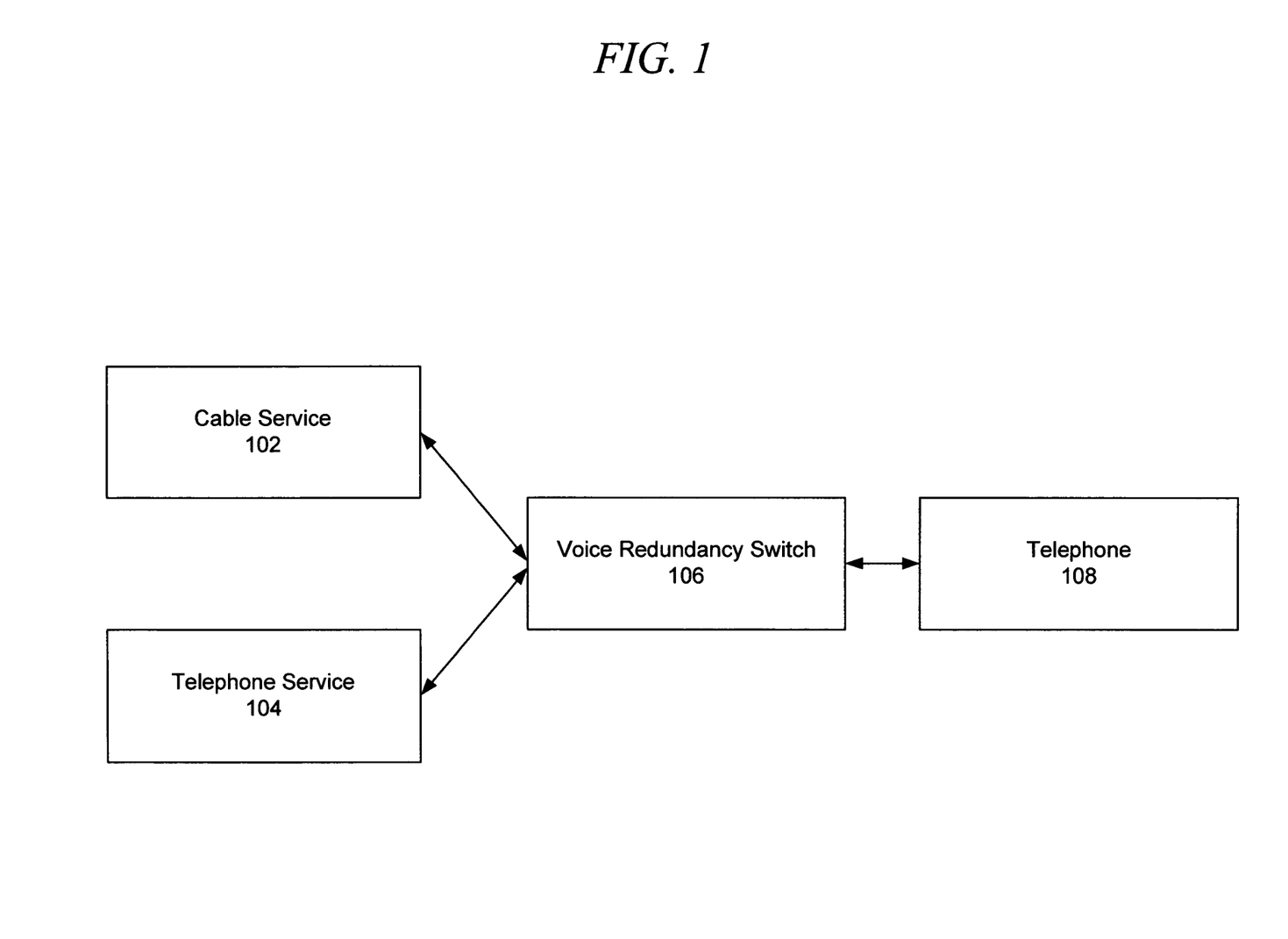
FIG. 1 is a block diagram of a voice redundancy system in accordance with an illustrative embodiment.

FIG. 1 is a block diagram of a voice redundancy system in accordance with an illustrative embodiment. The voice redundancy system 100 of FIG. 1 may include various elements, including a cable service 102, a telephone service 104, a voice redundancy switch 106, and a telephone 108. In another embodiment, the voice redundancy system 100 may include other elements, devices, or configurations for providing voice communications services. One embodiment of the voice redundancy switch 106 is further described in FIG. 2.

The voice redundancy system 100 may be used to provide a voice redundancy backup for digital packet telephony services provided through a digital connection. In one example, the digital connection may be a cable connection. However, the digital connection may be a fiber optic, digital subscriber line, wireless, or other data connection suitable for digital voice communication. Similarly, the digital packet telephony service may be a VoIP service or other service for digital packet communication service that may require a powered connection at a provider or user-end to enable voice communication services. For example, in the event that power is unavailable at the user's residence, the user may be unable to use the digital packet communication service to carry on voice communication. Similarly, the digital packet communication service may be unavailable if the power at one or more nodes of the digital packet communication network providing the digital packet telephony service is unavailable. The example of the cable service 102, connection, and VoIP service is used as a widespread example of communications used by many users and is not intended as a limitation.

The elements of the voice redundancy system 100 may be configured to allow a residential or small business cable subscriber to have voice redundancy in the event of a failure or an error of the cable service 102. The cable service 102 may be a high speed data connection provided by a cable operator, provider, or company. In other embodiments, the cable service 102 may be represented by a fiber optic provider, wireless, or other suitable communications service provider. For example, the telephone 108 may be provided voice dialing service through a WiMAX connection that may have reliability and stability issues similar to a VoIP service provided by the cable service 102.

The cable service 102 may be configured to provide a VoIP connection to the telephone 108. The voice redundancy system 100 may include any number of servers, routers, converters, cable modems, phone adapters, or other specialized equipment interconnected between the cable service 102 and the telephone 108 to effectively provide VoIP telephone service. The telephone 108 may be a standard analog telephone available to most users. However, the telephone 108 may be a digital phone, a VoIP phone, or a combination telephone suitable to handle digital, analog, Internet, and other forms of voice communications service.

The telephone service 104 may be a standard telephone connection that provides a standard dial tone or POTS to any number of users. The telephone service 104 may be more reliable than the cable service 102 because of the long standing development and infrastructure used to provide the telephone service 104. In particular, the power necessary to operate many types of telephones may be provided through the telephone connection provided by the telephone service 104. In contrast, the framework structure, and devices used by the cable service 102 are still in their infancy as far as development and technical reliability are concerned. The functionality of the cable service 102 may be dependent on power available to the cable provider, telephone 108, and data service.

A cable connection interconnects the cable service 102 and the voice redundancy switch 106. For example, the cable service 102 may provide underground or overhead wiring to a customer's premises that a technician or other qualified individual connects to the voice redundancy switch 106. Similarly, the telephone service 104 is interconnected to the voice redundancy switch 106 by a telephonic connection or wiring. The voice redundancy switch 106 may be a device configured to switch from the cable service 102 to the telephone service 104 in the event of a failure, a problem, malfunction, interference, data errors, latency, or other technical or delivery problems that prevents the user from carrying out a voice conversation through the telephone 108.

The voice redundancy switch 106 may, by default, use the cable service 102, to carry on voice conversations through the telephone 108. In the event that the cable service 102 fails, the voice redundancy switch 106 may connect the telephone service 104 and the telephone 108 so that the user may still carry on voice conversations. As a result, the user of the telephone 108 may be able to initiate and receive voice communications regardless of whether the cable service 102 and the corresponding cable connection, signal, and VoIP service to the telephone 108 fails or experiences other issues.

In one embodiment, the telephone service 104 may play an alert, prompt, message, or other indicator to the user through the telephone 108 informing the user that the telephone service 104 has been activated and/or that the cable service 102 is currently unavailable. The telephone indicator may be helpful in determining how frequently the telephone service 104 provides a valuable back up to the cable service 102. In another embodiment, the telephone service 104 may send a signal or alert to the telephone 108 for display to the user. As a result, even if the user was not using the telephone 108 for voice services, the telephone 108 may indicate the availability of the cable service 102 and/or the telephone service 104. In another example, the telephone 108 may display a text or voice message such as "Backup telephone service activated."

The voice redundancy switch 106 provides a redundant telephonic back up for constantly providing the telephone 108 with a dial tone for carrying on voice conversations. Additionally, the voice redundancy switch 106 may monitor the cable service 102 to determine failures and also to record and report the uptimes and downtimes, or additional service information of the cable service 102 and the telephone service 104. This recorded service information may be stored in memory and subsequently passed along to a user in the form of an invoice, email, bill, or other communication. In one embodiment, the service information may be electronically conveyed through a server/client relationship. The service information may be between the telephone service provider and presented to the user through a graphical user interface of a web page as further illustrated by FIG. 5.

The user of the telephone 108 may be charged a fee or service charge to have the telephone service 104 connected through the voice redundancy switch 106. The fee for the service may be a flat fee or a usage fee or a combination thereof. For example, the user of the telephone 108 may be charged a base fee and a per minute rate of thirty cents for communications made through the telephone service 104. In another embodiment, the telephone service 104 may bill the cable service provider for the voice redundancy switch 106 and available telephone service 104.

The service relationship established with a telecommunications provider in conjunction with the telephone service 104 and corresponding voice redundancy switch 106 may provide win-back opportunities for the telecommunications service provider to become the sole provider of voice communications in the future. The win-back opportunities may be further enhanced by the report service information provided by the telecommunications service provider regarding the cable service 102 and/or telephone service 104. The comparison of reliability as compared to price for a month or specified time period may further enhance the potential win-back opportunities for the telecommunications service provider while providing a valuable redundancy service.

Figure 2:
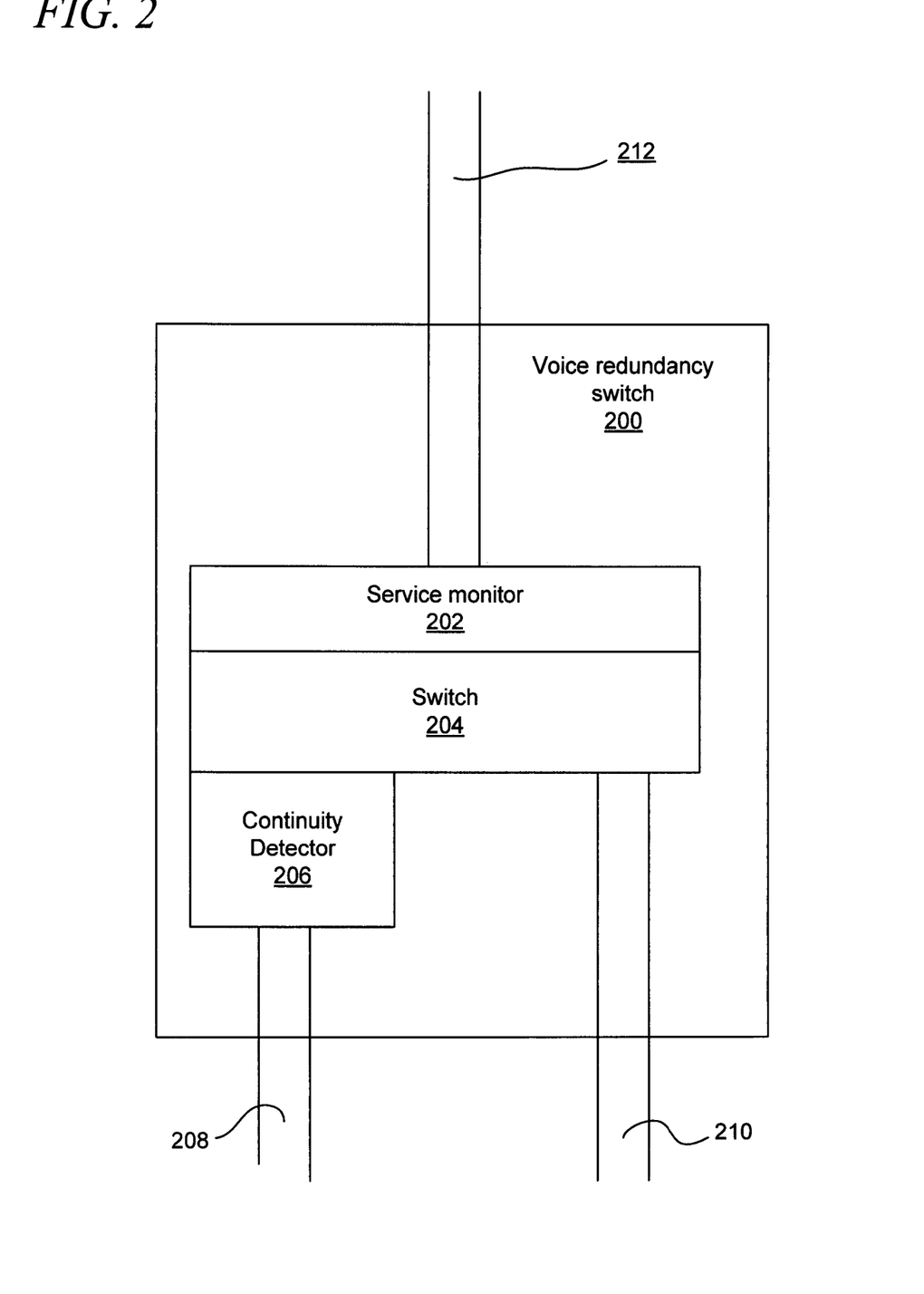
FIG. 2 is a block diagram of a voice redundancy switch in accordance with an illustrative embodiment.

FIG. 2 is a block diagram of a voice redundancy switch in accordance with an illustrative embodiment. The voice redundancy switch 200 is a particular implementation of the voice redundancy switch 106 of FIG. 1. The voice redundancy switch 200 may include various elements, including a service monitor 202, a switch 204, a continuity detector 206, a cable connection 208, a telephone connection 210, and a home connection 212. The voice redundancy switch 200 may function to ensure that the home connection 212 interconnected to a telephone, such as telephone 108 of FIG. 1, is always activated for providing voice service to a user.

The cable connection 208 and telephone connection 210 may be provided by the cable service 102 and telephone service 104 of FIG. 1, respectively. In another embodiment, the voice redundancy switch 200 may include a processor, a memory, a transceiver, a modem, a VoIP data adapter, error detection logic, and monitoring logic. Alternatively, the elements of the voice redundancy switch 200, as shown in FIG. 2 may be software modules that are executable to perform the features and methods herein described.

In one embodiment, the voice redundancy switch 200 includes the service monitor 202, the switch 204, and the continuity detector 206. The continuity detector 206 may monitor and detect the availability and functionality of the cable connection 208. For example, if the cable connection 208 is momentarily deactivated or electronically severed, the continuity detector 206 alerts the switch 204 and the service monitor 202. The continuity detector 206 may also ensure that the data signal or information sent and received through the cable connection 208 is valid for allowing a voice conversation. For example, if the cable connection 208 includes data that has been altered or otherwise corrupted preventing the appropriate voice conversation from reaching the user or a calling or receiving party, the continuity detector 206 may also alert the switch 204 and the service monitor 202. The continuity detector 206 may use error detection logic or software, parity circuits, cyclic redundancy check or other circuits to determine whether the voice signal or data transmitted over the cable connection 208 is valid. If the user is unable to utilize the cable connection 208 for VoIP communications, the cable connection 208 is determined to be unavailable.

In the event the cable connection 208 is severed or is otherwise unable to carry on a voice conversation, the switch 204 disconnects the cable connection 208 from connecting to or communicating with the home connection 212. Once the switch 204 has received a signal or other information from the continuity detector 206 indicating a problem with the cable connection 208, the switch 204 electronically connects the telephone connection 210 and the home connection 212.

Once the cable connection 208 has been reestablished, the continuity detector 206 may alert the switch 204 that the home connection 212 may be reconnected to the cable connection 208. The switch 204 may ensure that an ongoing conversation by the user through the telephone connection has ended before the home connection 212 is reconnected to the cable connection 208 in order to prevent the user from experiencing disconnected calls and further inconvenience based on the availability of the cable connection 208. In one embodiment, the voice redundancy switch 200 may play an alert, prompt, message, or specialized dial tone indicating the cable connection 208 and corresponding VoIP is once again available.

The service monitor 202 may record service information for the cable connection 208 and the telephone connection 210. In one example, the monitor includes a memory for storing the service information. The service information may include uptime, downtime, failure statistics, failure times, failure durations, and other relevant information regarding the cable service and telephone service provided to the home connection 212. For example, in the event that the cable connection 208 is available, but the continuity detector 206 determines that data is not being transmitted and received properly through the cable connection 208, the service monitor 202 may record the time and the date of the communications failure.

The service monitor 202 may send service information to a telecommunications service provider through the telephone connection 210. In one embodiment, the service monitor 202 may include a modem or transceiver and logic for sending the service information to the telecommunications service provider. In another embodiment, the service monitor 202 may report the service information directly to the user through the home connection 212. For example, the user may dial a code or pass key that enables the service monitor 202 to report relevant statistics, information, and other failure data as recorded or as requested by the user.

The service information sent from the service monitor 202 through the telephone connection 210 to the telecommunications service provider may be analyzed, configured, or otherwise formatted for display to the user. For example, the service information may be available to the user through an Internet connection or available on a monthly invoice. The service monitor 202 may transmit the service information intermittently or based on failures or problems of the cable connection 208 and telephone connection 210. In general, the cable connection 208 is more likely to experience a failure than the telephone connection 210 because most VoIP services are dependent on both power and data service and are continuing to develop as a communications medium. As a result, if there is a power outage or data service problem, the cable connection 208 may be unable to facilitate voice communication between a user and another party.

The voice redundancy switch 200 may be positioned near a network interface device or cable junction box on the exterior of the home. In another embodiment, the voice redundancy switch 200 may be connected within the home. The voice redundancy switch 200 may be professionally connected by the telecommunications service, or alternatively, the voice redundancy switch 200 may be purchased and installed directly by the user. In one example, after connecting the voice redundancy switch 200 the user may request that the telephone connection 210 be reactivated as a backup in order to fully enable the voice redundancy switch 200. As previously discussed, the cost of the telephone connection may be reduced because the telephone connection 210 is only a backup connection.

Figure 3:
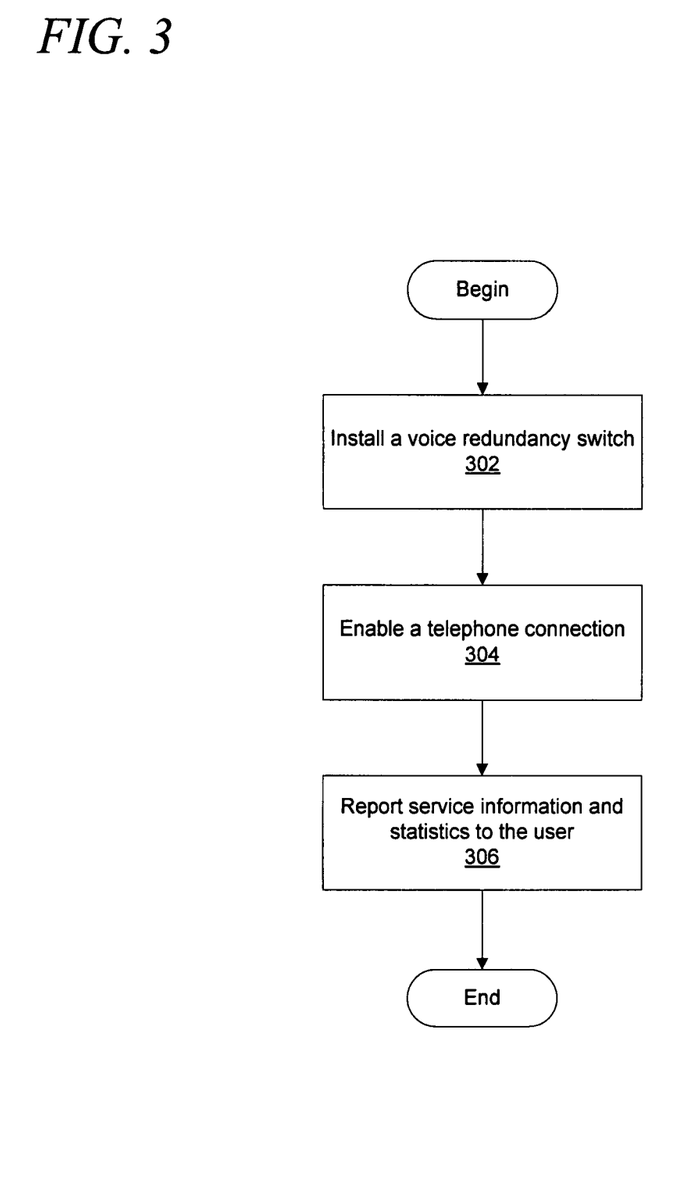
FIG. 3 is a flowchart of a process for establishing a voice redundancy system in accordance with an illustrative embodiment.

FIG. 3 is a flowchart of a process for establishing a voice redundancy system in accordance with an illustrative embodiment. The process of FIG. 3 may be implemented by a telecommunications service provider. In particular, portions of the process of FIG. 3 may be implemented by a technician, or through a class 5 switch, local exchange, or other telecommunications management system.

The process may begin with the telecommunications service installing a voice redundancy switch (step 302). During step 302, the voice redundancy switch may be interconnected to a cable connection, a telephone connection, and home wiring for enabling voice conversations through one or more telephones connected to the home wiring. The home wiring may be part of a home network branching out to any number of ports or jacks within the home. As previously mentioned, the voice redundancy switch may be connected or mounted to the exterior of the home as part of a junction box, or installed within the home or a garage. Alternatively, the voice redundancy switch may be a stand alone device installed within the home. The voice redundancy switch may also be part of a junction box or communications storage device. In one example, the voice redundancy switch may be integrated with a VoIP adapter for easy installation.

Next, the telecommunications service enables a telephone connection (step 304). The telephone connection may be enabled through an exchange switch or other communications control device. In one example, the telephone connection is a standard twisted pair analog connection that provides service to the user's premises. The telephone connection 304 may be physically connected or enabled in the field by a technician, or by a communications network manager through a control device, server, or other application of the control system of the telecommunications service provider.

Next, the telecommunications service reports service information and statistics to the user (step 306). Once enabled, the voice redundancy switch constantly monitors both the cable connection used to provide VoIP service and the telephone connection activated in step 304. The service information is monitored and recorded by the voice redundancy switch for immediate or subsequent transmission to the telecommunications service provider. For example, failure information for the cable in memory and transmitted to a collection device using either connection when the connection is not in use.

The service information may be translated into statistics, graphs, and other useful information by the telecommunications service provider. Alternatively, the voice redundancy switch may send the service information, which may include calculated statistics and other performance information of the stability and availability of both the cable connection and the telephone connection connected to the voice redundancy switch. The service information may be reported to the user through a graphical user interface. In one embodiment, a server of the telecommunications service provider may enable a user to access service information in the form of a file or web browsing application. Alternatively, the user may dial a specified number that accesses a server or management system of the telecommunications service provider to retrieve the service information and statistics.

Figure 4:
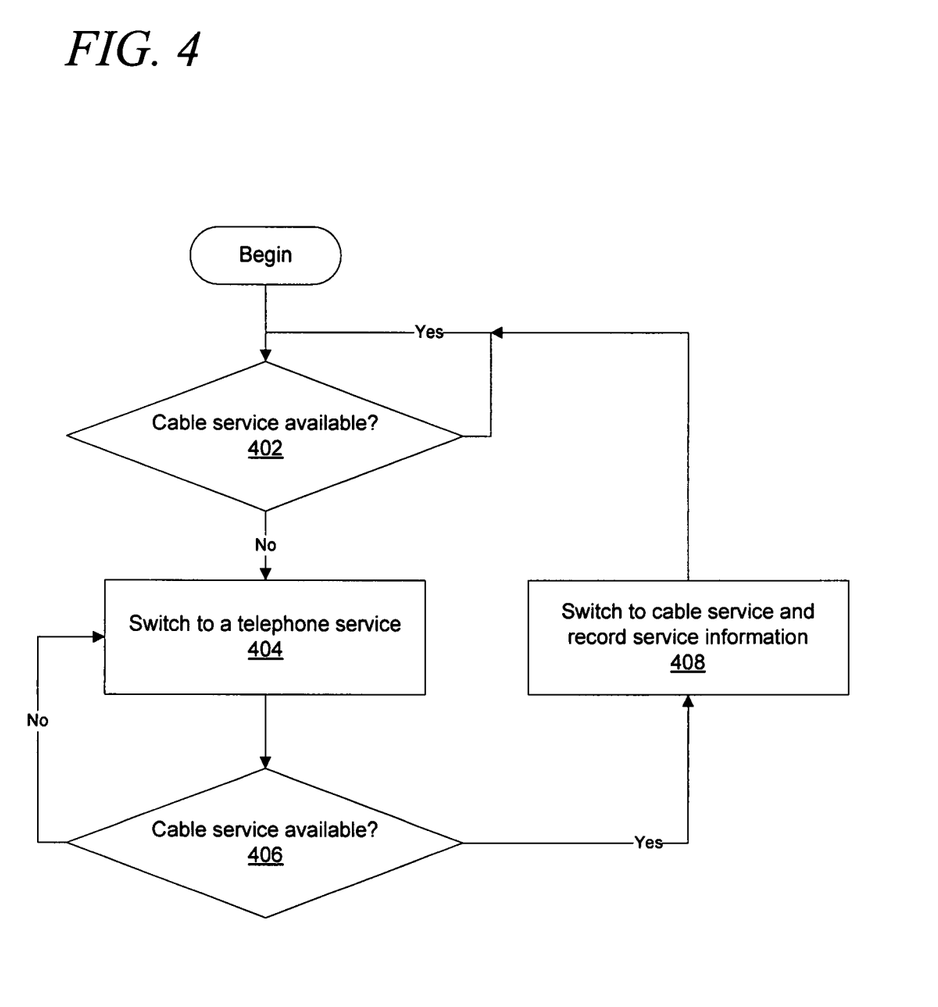
FIG. 4 is a flowchart of a process for voice redundancy in accordance with an illustrative embodiment.

FIG. 4 is a flowchart of a process for voice redundancy in accordance with an illustrative embodiment. The process of FIG. 4 may be implemented by a voice redundancy switch. The process may begin by determining whether cable service is available (step 402). The determination of step 402 may be made based on a continuity detector or monitor within the voice redundancy switch. For example, in the event that the cable connection is severed or the data sent and received through the cable connection in conjunction with the VoIP service is determined to be garbage or otherwise unintelligible, the cable service is determined to be unavailable. Alternatively, if voice conversations between a user of the cable service and another party are occurring without problem, the cable service is determined to be available. If the cable service is determined to be available, the determination of step 402 is continuously repeated. If the cable service is not available in step 402, the voice redundancy switch switches to a telephone service (step 404). The unavailability of the cable service automatically triggers the voice redundancy switch to switch to a backup voice service provided by the interconnected telephone connection. The telephone connection may be switched to or activated through the voice redundancy switch. The telephone service may include regular dialing and calling features. Alternatively, the telephone service may only be enabled for emergency dialing, such as dialing 911 or other specified emergency numbers.

In one embodiment, the cable service provider and the telephone service provider are separate entities. As a result, the telecommunications service provides the voice redundancy switch and voice redundancy through the telephone connection in order to reconnect and maintain a customer-provider relationship with the customer. In another embodiment, the cable service and the telecommunications may be owned by a single operator. The voice redundancy switch provides a method for the operator to ensure that the customer has access to voice communications and calling features at all times, for increased customer satisfaction.

Next, the voice redundancy switch determines whether the cable service is available (step 406). The determination of step 406 may be made in the same manner as the determination of step 402. If the cable service is unavailable, then the voice redundancy switch switches to telephone service (step 404). If the telephone service is activated, the voice redundancy switch continues to provide the telephone service through the telephone communication.

If the voice redundancy switch determines the cable service is available in step 406, the voice redundancy switch switches to cable service and records service information (step 408). The service information is recorded for the outage or other communications problem detected by the voice redundancy switch. As part of step 408, the voice redundancy switch may send service information regarding performance and availability to the telecommunications service provider. This information may also be provided to the cable operator providing the cable service. The service information may be sent when a problem is detected, or at predefined intervals or based on other rules, policies, and/or criteria. In another example, the voice redundancy switch continuously monitors the cable and telephone connections and calculates relative performance information.

Next, the voice redundancy switch continues to determine whether cable service is available (step 402). The process of FIG. 4 is repeated continuously to ensure that the user may continuously have access to voice communications service, either through the cable connection, or through the telephone connection.

Figure 5:
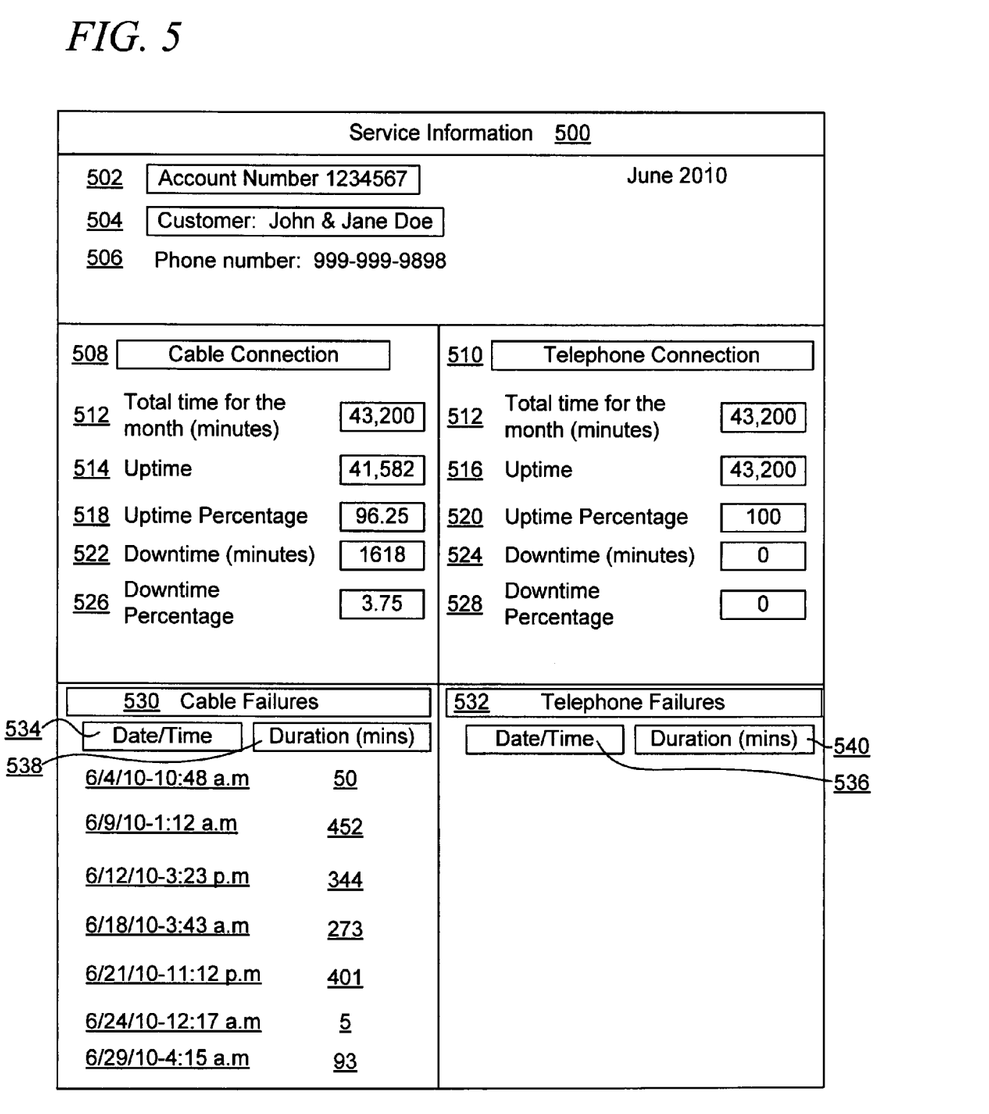
FIG. 5 is an invoice for a voice redundancy system in accordance with an illustrative embodiment.

FIG. 5 is an invoice for displaying service information of a voice redundancy system in accordance with an illustrative embodiment. FIG. 5 displays an invoice or graphical user interface for displaying service information 500. The service information 500 may be displayed to the user electronically, in a paper format, or using another medium. The service information 500 may include various elements including an account number 502, a customer 504, a phone number 506, a cable connection 508, a telephone connection 510, a total time for the month 512, an uptime 514 and 516, an uptime percentage 518 and 520, a downtime 522 and 524, a downtime percentage 526 and 528, cable failures 530, telephone failures 532, a date/time 534 and 536, and a duration 538 and 540.

In one embodiment, the user may access the service information using a client that connects to a server or database storing the service information through a data communications network. The server or intelligent network device may be managed by the telecommunications service provider that provides the telephone connection. In one embodiment, the user may need to provide a user name, password, account number 502, name such as customer 504, phone number 506, or other information for security purposes in order to view the service information 500. The service information 500 may specify details of a redundancy service purchased through the telecommunications service provider. In one example, the user may pay a reduced flat fee of five to twenty dollars a month in order to enable the redundancy service. The fee of the redundancy service may also be listed on the service information. In one example, the user may be charged a base rate of five dollars for the service plus a twenty five cent per minute charge for each minute of voice service used while the cable connection is unavailable. In another example, the telecommunications service provider may bill the cable provider for the minutes used as a back up to the VoIP service.

The service information 500 includes details for both the cable connection 508 and the telephone connection 510. The service information 500 may include various details and statistics. The information shown is only for illustration purposes and not as a limitation of potential service information 500 available to the user. As shown, the total time 512 may display the amount of time in the time period. For example, the time period may be a month and the total time 512 may specify the sum of all minutes within that month.

The uptime 514 shows the time during which the cable connection was available. The uptime percentage may show the percentage of the total time 512 that the cable connection 508 was available. The downtime 522 may show the time periods during which the cable connection 508 was unavailable or experiencing problems that prevented the user from carrying on a voice conversation through the cable connection. The downtime percentage 526 shows the percentage of the time that the cable connection 508 was unavailable to the user. The details of the cable connection 508 may be displayed in seconds, minutes, or hours. In one embodiment, the user or an administrator of the telecommunications services may specify the units of time used for displaying the service information 500.

The cable failures 530 indicate the date/time 534 and duration 538 during which the cable connection 508 was unavailable to the user. The user may find the cable failures 530 useful for determining how often the service was unavailable for information and planning purposes. For example, based on the service information available within the cable connection 508 and telephone connection 510, the user may determine whether the additional monthly charge to obtain complete telephone service is worth avoiding the downtime 522 of the cable connection 508. The uptime 516, uptime percentage 520, downtime 524, and downtime percentage 528 may be independently monitored and calculated. As a result, the user may receive an unbiased report of the available voice communications services in order to make informed decisions.

As shown in the example of FIG. 5, the uptime 516 for the telephone connection 510 is available 100% of the time. This may not be true in all cases. However, telephone connections 510 are, generally, more reliable than cable connections, based on the technology and service requirements of both. As shown, the telecommunications failures 532 do not list any date/time 536 and duration 540 because there were no telecommunications failures. In another embodiment, the measured or calculated data for the telecommunications connection 510 may be used to approximate the values and statistics for the cable connection 508. As a result, the voice redundancy switch or telephone service provider may not need to directly monitor the cable provider and/or cable connection.

The previous detailed description is of a small number of embodiments for implementing the invention and is not intended to be limiting in scope. The following claims set forth a number of the embodiments of the invention disclosed with greater particularity.

What is claimed:

1. A method for providing voice redundancy service, the method comprising:
   providing, at a residential customer premise, a voice redundancy switch in communication with a digital packet telephony service, an analog telephone connection, and a customer telephone, wherein the voice redundancy switch is a stand-alone device separate from a digital packet telephony adapter utilized with the digital packet telephone service;
   monitoring, with the voice redundancy switch, the digital packet telephony service for availability of a signal, wherein the digital packet telephone service is determined to be unavailable in response to determining the signal associated with the digital packet telephony service is unavailable to carry a voice conversation;
   automatically switching a voice communication service to the analog telephone connection in response to determining the signal is unavailable;
   providing an indication to the customer that the switch to the analog telephone connection has occurred in response to switching to the analog telephone connection, the indication comprising at least one of a visual indicator, a message, or a specialized dial tone;
   recording service information for a cable connection providing the digital packet telephone service and the analog telephone connection; and
   reporting the uptime and downtime of a digital connection providing the digital packet telephony service and the analog telephone connection to prompt the user to switch from the digital packet telephony service to an analog telephone service associated with the analog telephone connection.

2. The method according to claim 1, wherein the voice redundancy switch is also separate from a device utilized by the analog telephone connection.

3. The method according to claim 1, wherein a user may make calls using the analog telephone connection while the digital packet telephony service is unavailable.

4. The method according to claim 3, wherein the calls are restricted to emergency calls only.

5. The method according to claim 1, wherein a special dial tone of the analog telephone connection indicates that the digital packet telephony service is unavailable.

6. The method according to claim 1, wherein a user of the digital packet telephony service and analog telephone connection is a residential user or a small business user, and wherein a stand-alone switch is enabled to communicate a message to the user indicating when the analog telephone connection is being utilized.

7. The method according to claim 1, further comprising:
   charging a user a base fee for availability of the analog telephone connection.

8. The method according to claim 7, further comprising:
   charging the user based on minutes used to make and receive voice communications using the analog telephone connection.

9. The method according to claim 1, wherein the analog telephone connection exclusively provides the voice communication service as a redundant backup.

10. The method according to claim 1, further comprising:
    switching back to the digital packet telephony service in response to determining a digital connection providing the digital packet telephony service is available and voice communications are not occurring.

11. A system for providing voice redundancy services, the system comprising:
    a voice redundancy switch located at a residential customer premise and in communication with a digital packet telephony service, an analog telephone connection, and a customer telephone, the voice redundancy switch comprising:
      a continuity detector for determining whether the digital packet telephony service is available through a digital connection, wherein the digital packet telephony service is determined to be unavailable in response to determining the digital connection associated with the digital packet telephony service is unavailable or invalid for carrying a voice conversation; and
      a switch in communication with the continuity detector for automatically switching from the digital connection to the analog telephone connection and plain old telephone service in response to determining the digital connection is unavailable, wherein the continuity detector provides an indication to the customer that the switch to the analog telephone connection has occurred in response to switching to the analog telephone connection, the indication comprising at least one of a visual indicator, a message or a specialized dial tone;

wherein the voice redundancy switch is a stand-alone device separate from a digital packet telephony adapter utilized with the digital packet telephone service, and wherein the voice redundancy switch:

records service information for a cable connection providing the digital packet telephone service and the analog telephone connection; and reports the uptime and downtime of a digital connection providing the digital packet telephony service and the analog telephone connection to prompt the user to switch from the digital packet telephony service to an analog telephone service associated with the analog telephone connection.

12. The system according to claim 11, wherein the voice redundancy switch is wired to a home network for providing voice communication services to one or more telephones.

13. The system according to claim 11, further comprising: a monitor in communication with the switch for storing service information about availability of the digital connection and the analog telephone connection, wherein the monitor is configured to send service information for display to a telecommunications service provider.

14. The system according to claim 13, wherein the service information includes an uptime, a downtime, and failure information for the digital connection and the analog telephone connection.

15. The system according to claim 14, wherein the monitor records the service information in response to the continuity detector determining that the VoIP service is unavailable.

16. The system according to claim 11, wherein the switch switches back to the digital connection and digital packet telephony service in response to determining the digital packet telephony service is available and voice communications are not occurring.

17. A system for providing voice redundancy services, the system comprising:

a voice redundancy switch located at a residential customer premise and in communication with a digital packet telephony service, an analog telephone connection, and a customer telephone, the voice redundancy switch comprising:

a processor for executing a set of instructions;

a switch for switching between a digital connection and the analog telephone connection for providing voice calling services in response to determining the digital connection is unavailable for voice communications; and a memory for storing the set of instructions, wherein the set of instructions monitors the digital packet telephony service provided by the cable connection for continuity of the digital packet telephony service, commands the switch to switch from the digital connect to the analog telephone connection in response to determining the digital connection is unavailable for voice communications, and provides an indication to the customer that the switch to the analog telephone connection has occurred in response to switching to the analog telephone connection, wherein the digital packet telephone service is determined to be unavailable in response to determining the digital connection associated with the digital packet telephony service is unavailable or invalid for carrying a voice conversation, the indication comprising at least one of a visual indicator, a message or a specialized dial tone;

wherein the voice redundancy switch is a stand-alone device separate from a digital packet telephony adapter utilized with the digital packet telephone service, and wherein the voice redundancy switch:

records service information for a cable connection providing the digital packet telephone service and the analog telephone connection; and reports the uptime and downtime of a digital connection providing the digital packet telephony service and the analog telephone connection to prompt the user to switch from the digital packet telephony service to an analog telephone service associated with the analog telephone connection.

18. The system according to claim 17, wherein the set of instructions further records service information about the digital connection and the analog telephone connection, and wherein the voice redundancy switch is operatively connected to a telephone service provider system for sending the service information for display to a user.

19. The system according to claim 18, further comprising: a client operatively connected to the telephone service provider system configured to display the service information to the user using a graphical user interface to encourage the user to switch from the digital packet telephone service to a plain old telephone service associated with the analog telephone connection.

20. The system according to claim 18, wherein the telephone service provider system calculates performance statistics and formats the service information for display to the user.

21. The system according to claim 17, wherein the digital connection is a cable connection and the digital packet telephony service is a voice over Internet protocol service.

22. The system according to claim 17, wherein the digital connection is any of a cable connection, a digital subscriber line connection, a fiber optic connection, and wireless connection.

* * * * *